United States Patent
Rebholz et al.

(10) Patent No.: US 9,616,830 B2
(45) Date of Patent: Apr. 11, 2017

(54) VEHICLE ELECTRICAL DISTRIBUTION SYSTEM STABILIZATION

(71) Applicant: Dr. Ing. h.c. F. Porsche Aktiengesellschaft, Stuttgart (DE)

(72) Inventors: Heinz Rebholz, Neuhausen (DE); Steffen Kehl, Rutesheim (DE)

(73) Assignee: DR. ING. PORSCHE AKTIENGESELLSCHAFT, Stuttgart (DE)

( * ) Notice: Subject to any disclaimer, the term of this patent is extended or adjusted under 35 U.S.C. 154(b) by 324 days.

(21) Appl. No.: 14/316,218

(22) Filed: Jun. 26, 2014

(65) Prior Publication Data
US 2015/0001925 A1  Jan. 1, 2015

(30) Foreign Application Priority Data
Jun. 28, 2013  (DE) .................. 10 2013 106 777

(51) Int. Cl.
*H02G 3/00* (2006.01)
*B60L 1/00* (2006.01)
(Continued)

(52) U.S. Cl.
CPC ........ *B60R 16/033* (2013.01); *F02N 11/0866* (2013.01); *H02J 1/08* (2013.01); *H02J 7/14* (2013.01); *H02J 2001/008* (2013.01)

(58) Field of Classification Search
CPC ............... F02N 11/0866; B60R 16/033; H02J 2001/008; H02J 7/14; H02J 1/08
(Continued)

(56) References Cited

U.S. PATENT DOCUMENTS 6,879,057 B1 * 4/2005 Pinas .................. B60R 16/0238
307/10.1
7,687,934 B2 * 3/2010 Helmick .................. B60L 7/16
307/9.1
(Continued)

FOREIGN PATENT DOCUMENTS

JP  2001069683  3/2001
JP  2004229461  8/2004
(Continued)

OTHER PUBLICATIONS

Japanese Office Action Dated Jun. 8, 2016.

*Primary Examiner* — Carlos Amaya
*Assistant Examiner* — Esayas Yeshaw
(74) *Attorney, Agent, or Firm* — Gerald E. Hespos; Michael J. Porco; Matthew T. Hespos

(57) ABSTRACT

A transfer device for energy in a motor vehicle is designed for connection to a first vehicle electrical distribution system and a second vehicle electrical distribution system, which each comprise an associated energy store. In this case, the transfer device comprises a first sampling device for determining that the two energy stores have been filled sufficiently, a second sampling device for detecting an energy withdrawal from one of the vehicle electrical distribution systems, and a DC-to-DC converter for transferring energy between the vehicle electrical distribution systems. In addition, a control device is provided which is designed, in an automatic mode to control a transfer of energy from one of the vehicle electrical distribution systems into the other vehicle electrical distribution system on the basis of the signals of the sampling devices when energy is withdrawn from the other vehicle electrical distribution system.

9 Claims, 2 Drawing Sheets

(51) Int. Cl.
 *B60L 3/00* (2006.01)
 *B60R 16/033* (2006.01)
 *F02N 11/08* (2006.01)
 *H02J 1/08* (2006.01)
 *H02J 7/14* (2006.01)
 *H02J 1/00* (2006.01)

(58) Field of Classification Search
 USPC ........................................................ 307/10.1
 See application file for complete search history.

(56) References Cited

U.S. PATENT DOCUMENTS

| | | | | |
|---|---|---|---|---|
| 8,319,472 B2* | 11/2012 | Gibbs | ................. | F02N 11/0866 307/10.6 |
| 8,963,365 B2* | 2/2015 | King | ................... | B60L 11/1857 174/255 |
| 9,190,915 B2* | 11/2015 | Inoue | ................ | H02M 3/33584 |
| 2008/0067227 A1* | 3/2008 | Poss | ....................... | A47G 29/22 232/17 |
| 2010/0164446 A1* | 7/2010 | Matsuo | ................. | H02M 3/158 323/282 |
| 2012/0074894 A1* | 3/2012 | Chen | .................... | B60L 11/005 320/103 |
| 2012/0279490 A1* | 11/2012 | De Luca | .................. | F24J 2/08 126/634 |
| 2013/0127399 A1* | 5/2013 | Tang | ....................... | B60L 1/003 320/104 |
| 2013/0278051 A1* | 10/2013 | Wisnewski | ............. | H01B 7/30 307/2 |
| 2014/0048031 A1 | 2/2014 | Woelfl et al. | | |
| 2014/0368160 A1* | 12/2014 | Reichow | .................. | H02J 1/08 320/107 |

FOREIGN PATENT DOCUMENTS

| | | |
|---|---|---|
| JP | 2007237809 | 9/2007 |
| JP | 2007325381 | 12/2007 |
| JP | 2008312404 A | 12/2008 |
| JP | 200110502 | 1/2011 |

\* cited by examiner

VEHICLE ELECTRICAL DISTRIBUTION SYSTEM STABILIZATION

CROSS REFERENCE TO RELATED APPLICATION

This application claims priority under 35 USC 119 to German Patent Appl. No. 10 2013 106 777.8 filed on Jun. 28, 2013, the entire disclosure of which is incorporated herein by reference.

BACKGROUND

1. Field of the Invention

The invention relates to vehicle electrical distribution system stabilization. In particular, the invention relates to stabilization of two separate vehicle electrical distribution systems onboard a motor vehicle.

2. Description of the Related Art

A motor vehicle comprises a vehicle electrical distribution system which is generally fed by a generator, which is driven by an internal combustion engine for driving the motor vehicle. A second vehicle electrical distribution system which is isolated from the first vehicle electrical distribution system can be provided, for example when the motor vehicle has an additional electrical drive. The two vehicle electrical distribution systems generally have different rated voltages. The first vehicle electrical distribution system can have, for example, a rated voltage of 12 V, and the second vehicle electrical distribution system can have a rated voltage in the range of between 24 and 60 V.

A transfer device for energy transmission can be provided between the vehicle electrical distribution systems. An energy deficit in one of the vehicle electrical distribution systems can be compensated for from the respective other vehicle electrical distribution system by means of the transfer device. In this case, the transfer device necessarily comprises a DC-to-DC converter, which is capable of transferring energy in both directions.

Generally, a transfer mode which indicates the direction in which energy transfer needs to take place is controlled by means of a separate control device. The control device is generally connected to the transfer device by means of a data bus, for example, a controller area network (CAN) bus.

US2014/0048031 discloses an apparatus and a method for energy compensation between different vehicle electrical distribution systems onboard a motor vehicle.

For short-term events which can represent a load on one of the vehicle electrical distribution systems in terms of their energy balance, the known transfer devices respond too slowly, however. Consumers subject to pulses, such as, for example, an electric drive of a power-assisted steering system can thus severely load one of the vehicle electrical distribution systems.

The invention is therefore based on the object of specifying a transfer device, a method and a computer program product which enable improved stabilization of the vehicle electrical distribution system. The invention achieves this object by means of the subjects of the independent claims. The dependent claims set forth preferred embodiments.

SUMMARY OF THE INVENTION

A transfer device according to the invention for energy in a motor vehicle is designed for connection to a first vehicle electrical distribution system and a second vehicle electrical distribution system, which each comprise an associated energy store. In this case, the transfer device comprises a first sampling device for determining that the two energy stores have been filled sufficiently, a second sampling device for detecting an energy withdrawal from one of the vehicle electrical distribution systems, and a DC-to-DC converter for transferring energy between the vehicle electrical distribution systems. In addition, a control device is provided which is designed, in an automatic mode to control a transfer of energy from one of the vehicle electrical distribution systems into the other vehicle electrical distribution system on the basis of the signals of the sampling devices when energy is withdrawn from the other vehicle electrical distribution system.

Since the sampling devices are provided locally at the transfer device, a lag time which can elapse up to the determination of the presence of the preconditions for corresponding energy transmission can be short. The voltage of at least one of the vehicle electrical distribution systems can thus also be stabilized in an improved manner under difficult conditions. In particular, it is possible to operate consumers which consume a high level of energy in pulsed fashion. Such consumers can comprise, for example, an electric starter motor, an electric power-assisted steering system or an electric braking device. The transfer device can provide improved energy compensation, which can make it possible to dimension one of the energy stores such that it is weaker. As a result, costs can be saved and a mass and an installation space onboard the motor vehicle can be saved.

Preferably, the vehicle electrical distribution systems have different rated voltages, and the DC-to-DC converter can be actuated to either step up the voltage of transferred energy from one vehicle electrical distribution system into the other vehicle electrical distribution system or to step down said voltage in the opposite direction. As a result, the transfer device can be used in particular on a motor vehicle with a low-voltage vehicle electrical distribution system and a medium-voltage or high-voltage vehicle electrical distribution system.

It is preferable that a change in the direction of transfer between the vehicle electrical distribution systems takes place within fewer than 10 ms, further preferably within less than 5 ms, after the beginning of the energy withdrawal. These response times are achievable by the omission of a complex data transmission, in particular on a serial bus, and can ensure improved stabilization of the vehicle electrical distribution system even in the event of short-term loading.

In one embodiment, the control device is designed to control the transfer of energy between the vehicle electrical distribution systems, as an alternative to the automatic mode, in one of two further modes, wherein in a first fixed mode, energy is transferred from the first vehicle electrical distribution system into the second vehicle electrical distribution system, and in a second fixed mode, energy is transferred from the second vehicle electrical distribution system into the first vehicle electrical distribution system. The mode used can be selected, for example, by means of an external control device. The external control device can activate the mode on the basis of more complex decisions, such as, for example, on the basis of a predictive determination of energy withdrawals. The automatic mode makes it possible to bypass the external control device and implement the decision finding for the direction of an energy transmission locally with increased speed in order to realize short response times.

In a development of this variant, an interface for receiving a control signal is provided, wherein the control device is designed to implement the control in the automatic mode, in the first fixed mode or in the second fixed mode depending on the received control signal. As a result, in particular improved compatibility with known transfer devices can be provided. This can make it possible to design the transfer device such that, in contrast to a known transfer device, it only controls an additional mode which can be activated if required and otherwise can be replaced by a known transfer device. The transfer device can thus be produced without any further differentiation with respect to the conditions in the motor vehicle in which it is to be installed.

A method according to the invention for energy compensation in a motor vehicle comprising two vehicle electrical distribution systems comprises the steps of determining that an energy store of the first vehicle electrical distribution system and an energy store of the second vehicle electrical distribution system have been filled sufficiently, detecting that an energy withdrawal is taking place in one of the vehicle electrical distribution systems, and transferring energy from the other vehicle electrical distribution system into this vehicle electrical distribution system.

The method can contribute to providing an improved energy compensation between vehicle electrical distribution systems onboard a motor vehicle, in particular in conjunction with the above-described transfer device.

In one embodiment, it is detected that the energy store of one of the vehicle electrical distribution systems has been filled sufficiently, for example when a voltage of the associated vehicle electrical distribution system reaches the rated voltage. Advantageously, the determination can thus be performed without an additional sensor being installed or data interchange with a further component outside the transfer device needing to be performed.

An energy withdrawal from one of the vehicle electrical distribution systems can be detected when the vehicle electrical distribution system voltage dips by more than a predetermined amount in a predetermined time. Thus, conventional, slow discharge of the energy store of this vehicle electrical distribution system can be distinguished from a consumer being switched on. In this way, devices outside of the transfer device can also be dispensed with for determining the energy withdrawal.

A computer program product according to the invention comprises program code means for implementing the described method when the computer program product is running on a processing device or is stored on a computer-readable data storage medium.

The invention will now be described in more detail with reference to the attached figures.

DETAILED DESCRIPTION OF THE PREFERRED EMBODIMENTS

Figure 1:
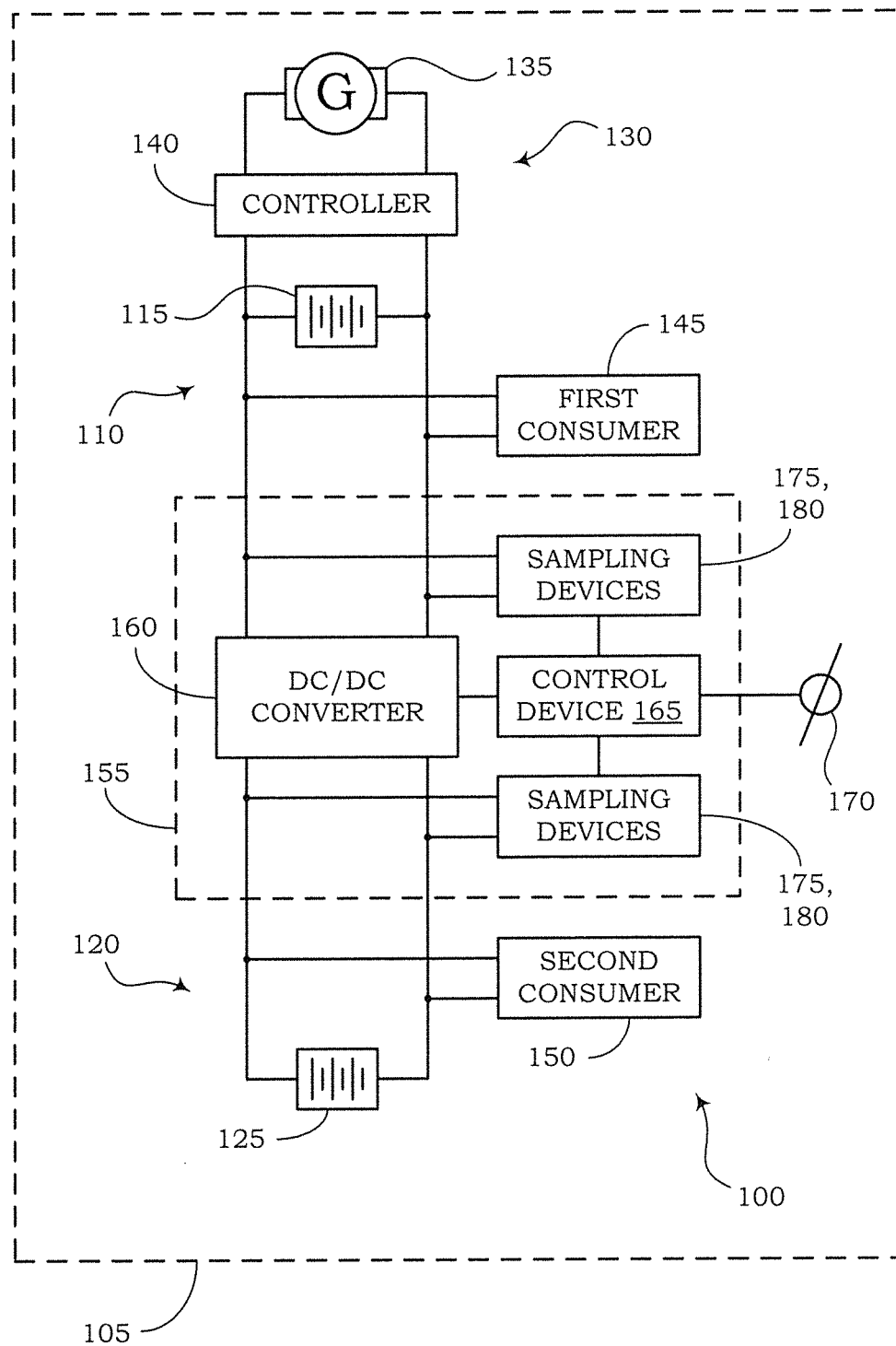
FIG. 1 shows a system comprising two vehicle electrical distribution systems of a motor vehicle which are connected to one another.

FIG. 1 shows a system 100 onboard a motor vehicle 105. The system 100 comprises a first vehicle electrical distribution system 110 comprising a first energy store 115 and a second vehicle electrical distribution system 120 comprising a second energy store 125. The vehicle electrical distribution systems 110 and 120 preferably have different rated voltages. In particular, end-of-charge voltages of the energy stores 115 and 125 can be different than one another. This configuration can be selected, for example, when an electric drive or additional drive of the motor vehicle 105 is intended to be fed from the second vehicle electrical distribution system 120, for example. By way of example, it is assumed here that the rated voltage of the first vehicle electrical distribution system 110 is lower than that of the second vehicle electrical distribution system 120. The first vehicle electrical distribution system 110 has, for example, a rated voltage of 12 V, while the second vehicle electrical distribution system 120 has an exemplary rated voltage of up to 60 V, preferably between 24 V and 58 V.

Generally, at least one of the vehicle electrical distribution systems 110, 120 has a charging device 130, which is fitted on the side of the first vehicle electrical distribution system 110, in the illustration shown in FIG. 1, and comprises, by way of example, a generator 135 and a controller 140. The generator 135 can be driven by a drive motor of the motor vehicle 105.

An exemplary first consumer 145 is provided on the first vehicle electrical distribution system 110, and a second exemplary consumer 150 is provided on the second vehicle electrical distribution system 120. A transfer device 155 for transferring energy from the first vehicle electrical distribution system 110 into the second vehicle electrical distribution system 120, or vice versa, is provided between the vehicle electrical distribution systems 110 and 120. The transfer device 155 comprises a DC-to-DC converter 160 for transferring energy and a control device 165 for controlling the DC-to-DC converter 160. Optionally, an interface 170 is provided, to which the control device 165 is connected. The interface 170 can in particular lead to a data bus onboard the motor vehicle 105, for example a CAN bus, in order to be able to control the control device 165 by means of an external component.

In addition, a first sampling device 175 and a second sampling device 180 are provided. In each case two examples of the sampling devices 175, 180 are provided, of which one is assigned to the first vehicle electrical distribution system 110 and the other is assigned to the second vehicle electrical distribution system 120. The first sampling device 175 for each vehicle electrical distribution system 110, 120 is provided for detecting whether an assigned energy store 115, 125 has been sufficiently filled. An energy store 115, 125 is considered to be sufficiently filled when the energy stored in the energy store has a predetermined value and has, for example, 80% of the maximum storage capacity. The fill level of the energy store can be detected, for example, on the basis of the voltage. In addition, other values for sufficient filling can also be used. For example, different charge values can be used for the two energy stores in order to identify a sufficient state of charge. The second sampling device 180 is designed to detect an energy withdrawal from the assigned vehicle electrical distribution system 110, 120. Interfaces to control devices can also be provided instead of the sampling devices 175, 180, for example directly at the energy stores 115 and 125, from which a state of charge or a fill level of the energy store 115, 125 can be obtained. Alternatively, information on the fill level of an energy store can be received via the interface 170.

In the present embodiment, the sampling devices 175 and 180 of the vehicle electrical distribution systems 110, 120 can be combined and their determinations can be performed in particular on the basis of an observation of the voltage of the respective vehicle electrical distribution system 110, 120.

On the basis of the signals of the sampling devices 175, 180, the control device 165 controls the DC-to-DC converter 160 in an automatic mode in such a way that electrical energy is transferred between the vehicle electrical distribution systems 110, 120 in the direction of the vehicle electrical distribution system 110, 120 which is subjected to the greatest load until both energy stores 115, 125 have been sufficiently filled. In the process, the control is preferably completely autonomous, i.e. no further control signals or measurement results from remote sensors or control devices which are connected in particular via the interface 170 are required for the control.

Figure 2:
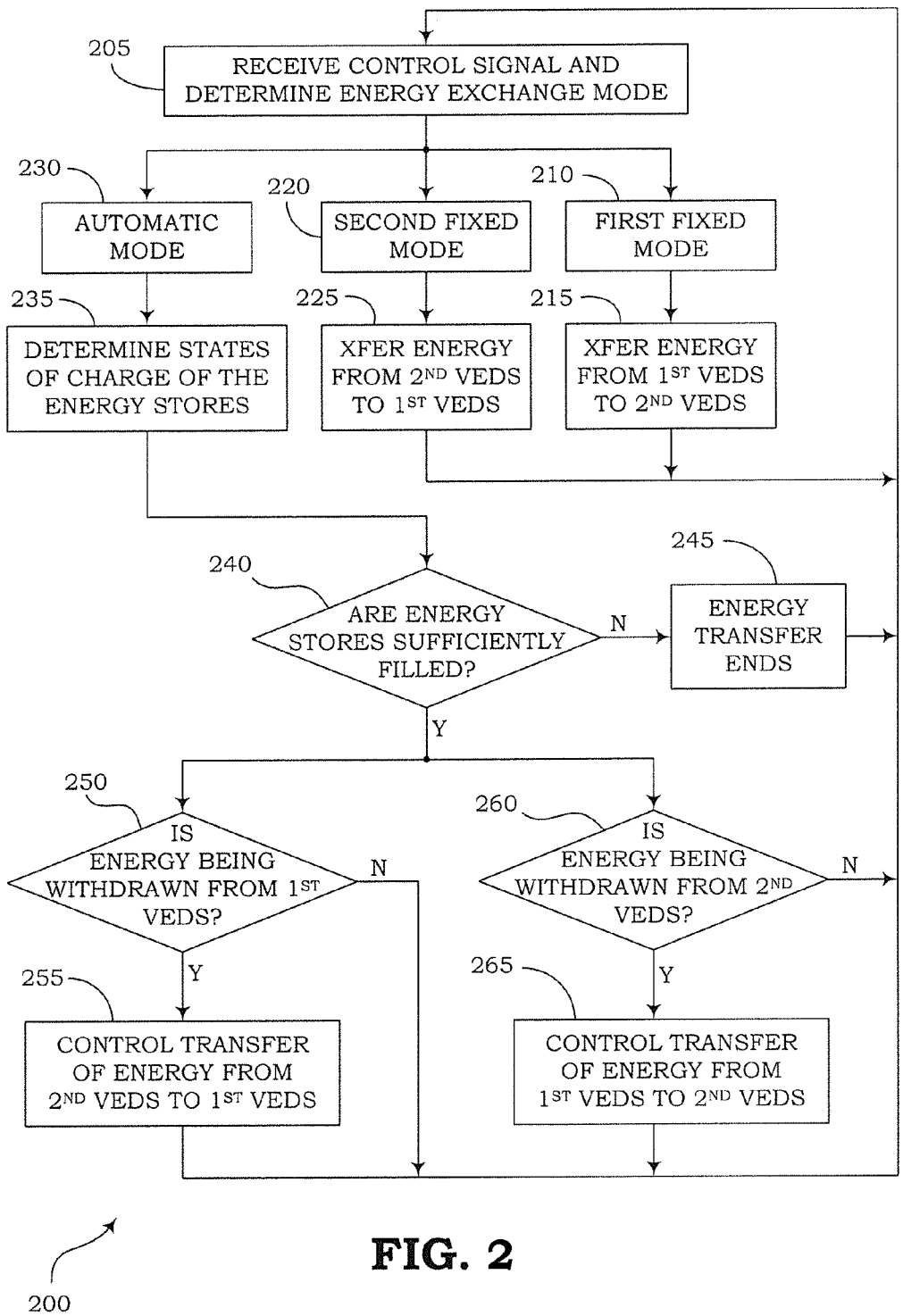
FIG. 2 shows a flowchart of a method for controlling energy exchange between the vehicle electrical distribution systems of the motor vehicle shown in FIG. 1.

FIG. 2 shows a flowchart of a method 200 for controlling energy exchange between the vehicle electrical distribution systems 110 and 120 of the motor vehicle 105 shown in FIG. 1. The method 200 is designed in particular for implementation on the control device 165. For this, the control device 165 can comprise a processing device for running a computer program product, in particular a programmable microcomputer.

The method 200 begins with a step 205, in which a control signal is received by an external control device, for example by means of the interface 170. Depending on the received control signal, of the three different modes that mode in which the energy exchange between the vehicle electrical distribution systems 110 and 120 is intended to take place is determined.

In a first fixed mode 210, in a step 215 energy is transferred from the first vehicle electrical distribution system 110 into the second vehicle electrical distribution system 120. In the example shown in FIG. 1, in this case the voltage of the transferred electrical energy is increased by the DC-to-DC converter 160. In a second fixed mode 220, in a step 225 energy is transferred in the reverse direction from the second vehicle electrical distribution system 120 into the first vehicle electrical distribution system 110. In the example in FIG. 1, in this case the voltage of the transferred electrical energy is stepped down.

In an automatic mode 230, in a step 235 states of charge of the energy stores 115 and 125 of the two energy systems 110 and 120 are determined. In a subsequent step 240, it is determined whether both energy stores are sufficiently charged. The determination can be based, for example, on whether the sampled vehicle electrical distribution system voltage has reached or exceeded a rated voltage of the respective vehicle electrical distribution system 110, 120 or energy store 115, 125. In one embodiment, the sampled vehicle electrical distribution system voltages can be filtered or smoothed, for example by means of a low-pass filter, before the voltage comparison takes place.

If at least one of the energy stores 115, 125 is not filled sufficiently, in a step 245 energy transfer between the vehicle electrical distribution systems 110 and 120 is ended if it is taking place at that time.

Otherwise, in a step 250, it is determined whether an energy withdrawal from the first vehicle electrical distribution system 110 is taking place. This can be detected, for example, from an observation of a dip in the voltage of the first vehicle electrical distribution system 110. The energy withdrawal, which can be caused by the first consumer 145 being switched on, for example, can be determined, for example, when the voltage of the first vehicle electrical distribution system 110 dips by more than a predetermined amount within a predetermined time. If no energy withdrawal or insufficient energy withdrawal from the first vehicle electrical distribution system 110 takes place, the method 200 returns to the beginning and can be run through again. Otherwise, in a step 255, a transfer of energy from the second vehicle electrical distribution system 120 into the first vehicle electrical distribution system 110 corresponding to step 225 is controlled. Then, the method 200 returns to the start again and can be run through again.

As far as possible in parallel with the steps 250 and 255, corresponding steps 260 and 265 are implemented, which steps relate to a withdrawal of energy from the second vehicle electrical distribution system 120 or an energy transfer from the first vehicle electrical distribution system 110 into the second vehicle electrical distribution system 120. Preferably, the steps 255 and 265 are coupled to one another in mutually exclusive fashion, with the result that no energy is transferred between the vehicle electrical distribution systems 110 and 120 when energy is being withdrawn from the two vehicle electrical distribution systems 110, 120. Alternatively, in the case of withdrawal on both sides, a preferential direction can also be provided or that vehicle electrical distribution system 110, 120 which is subjected to the greater load by the energy withdrawal benefits from particular support.

What is claimed is:

1. A transfer device for transferring electrical energy in a motor vehicle, the transfer device comprising:
    a first sampling device configured to determine whether a first energy store of a first vehicle electrical distribution system and a second energy store of a second vehicle electrical distribution system have been filled sufficiently;
    a second sampling device configured to detect whether electrical energy is being withdrawn from one of the first and second vehicle electrical distribution systems;
    a DC-to-DC converter configured to transfer electrical energy between the vehicle electrical distribution systems; and
    a control device configured to operate in an automatic mode to control a transfer of electrical energy;
    wherein, based on signals from the second sampling device indicating that electrical energy is being withdrawn from the second vehicle electrical distribution system, the control device is configured to control the transfer of electrical energy from the first vehicle electrical distribution system to the second vehicle electrical distribution system; and
    wherein, based on signals from the second sampling device indicating that electrical energy is being withdrawn from the first vehicle electrical distribution system, the control device is configured to control the transfer of electrical energy from the second vehicle electrical distribution system to the first vehicle electrical distribution system.

2. The transfer device of claim 1, wherein the first and second vehicle electrical distribution systems have different rated voltages, and wherein the DC-to-DC converter is configured to either step up or step down the voltage of transferred electrical energy from one vehicle electrical distribution system to the other.

3. The transfer device of claim 1, wherein a change in a direction of electrical energy transfer between the vehicle electrical distribution systems takes place within 10 msec from the beginning of the energy withdrawal.

4. The transfer device of claim 1, wherein the control device is configured to operate in additional modes, wherein, in a first additional mode, the control device is configured to transfer electrical energy from the first vehicle electrical distribution system to the second vehicle electrical distribution system, and, in a second additional mode, the control device is configured to transfer electrical energy from the second vehicle electrical distribution system to the first vehicle electrical distribution system.

5. The transfer device of claim 4, further comprising an interface configured to receive a control signal, wherein the control device is configured to implement the control device operating in the automatic mode, the first additional mode, or the second additional mode, depending on the received control signal.

6. A method for energy compensation in a motor vehicle, wherein the method comprises the steps of:
    determining whether a first energy store of a first vehicle electrical distribution system and a second energy store of a second vehicle electrical distribution system have been filled sufficiently;
    detecting whether electrical energy is being withdrawn from the first vehicle electrical distribution system; and
    transferring electrical energy from the second vehicle electrical distribution system to the first vehicle electrical distribution system.

7. The method of claim 6, wherein the first and second energy stores are determined to be filled sufficiently when a voltage of a respective vehicle electrical distribution system reaches its rated voltage.

8. The method of claim 6, wherein electrical energy is detected as being withdrawn from one of the vehicle electrical distribution systems when a voltage of the respective vehicle electrical distribution system dips by more than a predetermined amount in a predetermined time.

9. A computer program product comprising program code for implementing the method of claim 6, wherein the computer program product is configured to run on a processing device or is stored on a computer-readable data storage medium.

* * * * *